United States Patent
Plante et al.

(10) Patent No.: US 7,492,760 B1
(45) Date of Patent: Feb. 17, 2009

(54) MEMORY EGRESS SELF SELECTION ARCHITECTURE

(75) Inventors: Patrice Plante, Montreal (CA); Carl Dietz McCrosky, Saskatoon (CA); Winston Ki-Cheong Mok, Vancouver (CA); Pierre Talbot, Pierrefonds (CA)

(73) Assignee: PMC-Sierra, Inc., Santa Clara, CA (US)

( * ) Notice: Subject to any disclaimer, the term of this patent is extended or adjusted under 35 U.S.C. 154(b) by 739 days.

(21) Appl. No.: 10/812,958

(22) Filed: Mar. 31, 2004

Related U.S. Application Data

(60) Provisional application No. 60/458,375, filed on Mar. 31, 2003.

(51) Int. Cl.
*H04L 12/50* (2006.01)
*H04Q 11/00* (2006.01)

(52) U.S. Cl. .................. 370/363; 370/372; 370/376

(58) Field of Classification Search ............. 370/375, 370/379, 382, 383, 394, 395.43, 362, 363, 370/360
See application file for complete search history.

(56) References Cited

U.S. PATENT DOCUMENTS

| | | | |
|---|---|---|---|
| 4,512,014 A * | 4/1985 | Binz et al. | 370/358 |
| 4,545,053 A * | 10/1985 | Raamot | 370/369 |
| 4,998,242 A | 3/1991 | Upp | |
| 5,914,952 A | 6/1999 | Eom et al. | |
| 6,192,049 B1 * | 2/2001 | Sohraby | 370/389 |
| 6,430,180 B1 * | 8/2002 | Bohm et al. | 370/369 |
| 6,556,566 B1 * | 4/2003 | Ikeda | 370/376 |
| 6,570,873 B1 * | 5/2003 | Isoyama et al. | 370/375 |
| 6,658,006 B1 * | 12/2003 | Chen et al. | 370/395.1 |
| 6,931,002 B1 * | 8/2005 | Simpkins et al. | 370/354 |
| 7,031,330 B1 * | 4/2006 | Bianchini, Jr. | 370/412 |
| 7,046,665 B1 * | 5/2006 | Walrand et al. | 370/392 |
| 7,113,505 B2 * | 9/2006 | Williams | 370/370 |
| 7,215,665 B2 * | 5/2007 | Andrew | 370/375 |
| 7,266,128 B1 * | 9/2007 | Goldhammer et al. | 370/419 |
| 7,292,568 B2 * | 11/2007 | Boily | 370/376 |
| 2003/0053494 A1 * | 3/2003 | Mochizuki | 370/539 |
| 2003/0133406 A1 * | 7/2003 | Fawaz et al. | 370/229 |
| 2004/0008740 A1 * | 1/2004 | Baker | 370/537 |
| 2004/0120319 A1 * | 6/2004 | Asawa et al. | 370/395.4 |

FOREIGN PATENT DOCUMENTS

EP  0796548  10/2002

* cited by examiner

*Primary Examiner*—Wing F Chan
*Assistant Examiner*—Hicham B Foud
(74) *Attorney, Agent, or Firm*—Curtis B. Behmann; Borden Ladner Gervais LLP

(57) ABSTRACT

A method of time division multiplex switching reduces the implementation area by reducing the area required for both memory storage at each egress port and the multiplexing circuitry required. Ingress and egress processors are implemented to control the storage and selection of data grains to allow for the reduction in the memory and multiplexer areas.

17 Claims, 10 Drawing Sheets

CM: Connection Memory

MEMORY EGRESS SELF SELECTION ARCHITECTURE

CROSS REFERENCE TO RELATED APPLICATIONS

This application claims the benefit of priority of U.S. Provisional Application No. 60/458,375 filed Mar. 31, 2003, which is incorporated herein by reference.

FIELD OF THE INVENTION

The present invention relates generally to memory management in time-division multiplexing (TDM) switches. More particularly, the present invention relates to the storage of incoming grains in a TDM switch prior to retransmission.

BACKGROUND OF THE INVENTION

In telecommunication switching, time-division multiplex switching is commonly implemented. In such a system, a plurality of ingress ports provide a switch with grains containing data, and the received grains are multiplexed to one or more egress ports. The multiplexing of grains from ingress to egress ports is commonly done using a fixed mapping. Such time division multiplexed switches are commonly used to cross-connect lower rate signals (grains) that are contained within a higher rate signal, also referred to as a grain group. A grain group is composed of a fixed number of grains. In a standard synchronous optical network (SONET) based STS-48 channel carrying a VT1.5 virtual tributary, for example, each VT1.5 is a grain and the 1344 VT1.5s in the channel form a grain group.

FIG. 1 illustrates a plurality of data channels, received by ports A through N. Each port receives grain groups 100 containing G grains, one such grain being labelled as 102. Each grain 102 may be associated with an independent client and has a fixed location within the grain group 100. The entire grain group 100 is presented once every G clock cycles. Clock cycles are often referred to as timeslots, the use of either term should be considered interchangeable. An individual datum from a given client is available at each occurrence of the associated grain 102. The grain groups 100 in all the ports are shown to be aligned. This is a common requirement in TDM switches. In SONET switches, for example, an external alignment signal, which provides timing to the SONET transport frame or the tributary multi-frame, is used to align the grain groups.

FIG. 2 illustrates the general architecture of a TDM switch. In general, the switch has a number of inputs and number of outputs. Data grains 102 received by ingress ports (not shown) are ordered as ingress grain groups 100. The grains 102 are multiplexed by the switch 104 and transmitted by the egress ports (not shown) ordered as egress grain groups 106. For illustrative purposes, the switching system illustrated in FIG. 2 has N inputs and N outputs (N×N), but one skilled in the art will appreciate that a similar architecture can be implemented for asymmetrical switches. In FIG. 2, grains 102 are labelled with a letter representing the input port and a number (ranging from 1 to G, the number of grains in the ingress grain group 100) representing the byte position at the port. As can be seen in the output, bytes may be reordered to any position, may be multicast to several ports (or a single port), or may be dropped. FIG. 2 shows switching of grains within one grain group. The same switching of grains is performed at all recurrences of the grain groups.

FIG. 3 illustrates the conceptual implementation of an N×N memory switch 104. Two memories, 108a and 108b, are typically employed, each memory having N write ports 110 and N read ports 112. Two memories are used so that ingress ports can write a grain group to one memory using write ports 110 while the egress ports read a grain group from the other memory using read ports 112. The specific memory written to or read from alternates every grain group. The ingress ports write data into memory at an address that is indexed by the ingress port and timeslot numbers of the ingress grain. Egress ports read data from the address required to select the desired ingress grain thereby achieving the switching of ingress data to egress ports. The read address of the egress ports is defined by a connection memory that is configured by the user.

FIG. 4 illustrates the above described method of multiplexing grains from the ingress ports to egress ports. The switch receives a grain as part of a grain group at each of the ingress ports in step 114. These grains are buffered in a memory in step 116. In many implementations, the memory is sized to store one grain group from each of the ingress ports. The process of receiving and buffering grains is repeated until it has been determined that the last grain in a grain group has been received as shown in step 118. When the last grain in a grain group has been received, as determined in step 118, the process effectively forks. In the first fork, the memory bank used to buffer incoming grains is switched in step 120. In the second path of the fork, the memory bank that was just filled with incoming grains is used to multiplex out the received grains in step 122. This reading of the grains preferably takes no more than the amount of time required to fill a memory bank. The completely read out memory bank is then switched for a full memory bank in step 124. If the filling of a memory bank and the reading out a memory bank are timed properly, the process can repeat without a delay. The TDM switch will alternate between memory banks, so that as one memory bank is filled, via steps 114 and 116, the other is emptied via step 122. The memory banks are then switched in steps 120 and 124, preferably simultaneously.

It is common for switches to have a plurality of ingress and egress ports, though, using current technology, it is not practical to build fast memories with more than 3 or 4 ports. Generally, building a switch with multiple ingress and egress ports requires a slightly different architecture than the simplified illustration of FIG. 3. Two of the most common implementations are the flip-flop-based implementation illustrated in FIG. 5 and the RAM-based implementation illustrated in FIG. 6. Both these implementations make use of dual memory banks, and have an operating method similar to that illustrated in FIG. 4.

The flip-flop based implementation of an N×N memory switch, as illustrated in FIG. 5, works in two steps. First, the switch buffers all the incoming grains, received on ingress ports 110, in flip-flops, one of which is labelled 126. After receiving a full grain group, the grains are multiplexed out onto the egress ports 112. The multiplexing is performed according to the connection memory configuration 130 and requires a wide NG:1 multiplexer 128 per memory bank. Double buffering is employed to store one set of ingress grains while the other set is being multiplexed out. This implementation requires G flipflop storage elements 126 and a wide NG:1 multiplexer 128 for each egress port 112. The order of the area cost of a flip-flop based N×N memory switch is governed by the following equations:

$$\text{Area Cost}_{N \times N} = \text{Area}_{FF} + \text{Area}_{MUX} \quad (1.1)$$

$$\text{Area Cost}_{N \times N} = \text{Order }(NG) + \text{Order }(N^2 G \log_2(NG)) \quad (1.2)$$

Where N=number of ports

G=number of grains in a grain group

The random access memory (RAM) based implementation of an N×N memory switch works with the same two operational steps. First, the switch buffers all the incoming grains, received on the ingress ports 110, in RAMs, one of which is labelled 132. It then multiplexes the grains out onto the egress ports 112 according to the connection memory configuration 130. Double buffering is employed to store one set of ingress grains while the other set is being multiplexed out. The main difference from the flip-flop based implementation is all the ingress grains are stored in RAMs 132 instead of flip-flops. A RAM is more area efficient, but only one grain can be accessed at a time. Consequently, each ingress grain must be stored on a per egress port basis rather then on a per switch basis. Thus, the RAM based implementation minimizes the width of the egress multiplexer 134 to N:1 per egress port but requires NG storage elements 132 per egress port. The order of the area cost of a memory based N×N memory switch is governed by the following equations:

$$\text{Area Cost}_{N \times N} = \text{Area}_{RAM} + \text{Area}_{MUX} \quad (2.1)$$

$$\text{Area Cost}_{N \times N} = \text{Order}(N^2 G) + \text{Order}(N^2 \log_2(N)) \quad (2.2)$$

Where N=number of ports

G=number of grains in a grain group

Telecommunication systems typically have a maximum physical area and cost budget for printed circuit boards. Minimizing the physical area and cost of a printed circuit boards allows network equipment vendors to minimize equipment cost in order to gain market share. Since both physical area and cost are derived from both the number and physical dimension of integrated components, reducing the number and size of those components will have a positive effect on both the physical area and cost of the printed circuit board. In particular, memory switch area grows with switch capacity, thus it is important to reduce area in switching components to enable the design of large switching systems with a minimal number of components.

Both the implementation of FIG. 5 and the implementation of FIG. 6 consist of a memory to store ingress grains for subsequent output to the egress ports and multiplexing logic to select the desired ingress grain. The area costs for these implementations are defined above in equations 1.1, 1.2, 2.1 and 2.2.

In the flip-flop based implementation of FIG. 5, where a wide NG:1 multiplexer per egress port is required, the multiplexer is able to select NG ingress grains but only G ingress grains are selected per egress port. This results in a suboptimal utilization of the dedicated resources. The following equations give the utilization percentage of the egress multiplexer in a flip-flop based implementation of an N×N memory switch as illustrated in FIG. 5.

$$\text{Utilization \%}_{N \times N} = [\text{Tot egress mux} - \text{Inactive egress mux}]/[\text{Tot egress mux}] \quad (3.1)$$

$$\text{Utilization \%}_{N \times N} = [N^2 G \log_2(NG) - N(N-1) G \log_2((N-1)G)]/[N^2 G \log_2(NG)] \quad (3.2)$$

Where N=number of ports

G=number of grains in a grain group

For N=18 and G=1344 Utilization % $_{N \times N}$=6.1%

(i.e. 45G SONET/SDH VT/TU cross connect)

In the RAM based implementation of FIG. 6 which requires N RAMs per egress port, the RAMs hold NG ingress grains but only G ingress grains are read out per egress port. The area is not optimal with respect to the storage element.

The following equations gives the utilization percentage of the storage element in a RAM based implementation of an N×N memory switch.

$$\text{Utilization \%}_{N \times N} = [\text{Tot storage} - \text{Unused storage}]/[\text{Tot storage}] \quad (4.1)$$

$$\text{Utilization \%}_{N \times N} = [N^2 G - N(N-1)G]/[N^2 G] \quad (4.2)$$

$$\text{Utilization \%}_{N \times N} = 1/N \quad (4.3)$$

Where N=number of ports

G=number of grains in a grain group

For N=18 and G=1344 Utilization % $_{N \times N}$=5.5%

(i.e. 45G SONET/SDH VT/TU cross connect)

Though the RAM and flip-flop architectures allow for multiplexing the grains received by the ingress ports to the egress ports in a time efficient manner, their space consumption requires large implementations in chips and on printed circuit boards. These two factors increase their cost. The large implementation area is related to the poor utilization of multiplexing capacity and RAM storage. It is, therefore, desirable to provide a multiplexing egress structure that reduces the implementation size and increases the utilization percentage.

SUMMARY OF THE INVENTION

It is an object of the present invention to obviate or mitigate at least one disadvantage of previous time division multiplexing switches.

In a first aspect of the present invention, there is provided a time division multiplexing switch. The TDM switch comprises a plurality of ingress ports and at least one memory egress self selection (MESS) egress port. Each of the ingress ports in the plurality synchronously receives data grains at fixed time intervals. The received data grains are ordered as grain groups. The at least one MESS egress port receives the data grains from the plurality of ingress ports, preferably as an aggregate, and transmits stored data grains in a predetermined order. The at least one MESS egress port has a data grain selector for selecting data grains from the received data grains in accordance with at least one predetermined criterion prior to storing the selected grains for transmission by the MESS egress port.

In an embodiment of the first aspect of the present invention the plurality of ingress ports and the at least one memory egress self selection egress ports are equal in number, so that the switch is a symmetrical switch. In another embodiment of the present invention, the switch includes a grain aggregator, operatively connected to the plurality of ingress ports, for aggregating the data grains received by each of the ingress ports and for providing the aggregate to the at least one MESS egress port.

In a further embodiment of the first aspect of the present invention, the data grain selector includes an ingress processor for both receiving the aggregate and for selecting data grains from the aggregate for storage in accordance with the at least one predetermined criterion. In a presently preferred embodiment, the ingress processor includes both an interest memory for storing a grain mask corresponding to the predetermined grain selection criterion and a finite state machine for selecting grains from the aggregate for storage in accordance with the grain mask. In a further embodiment, the grain mask is based on the associated ingress port and the position of the grain the respective grain group.

In another embodiment, each of the MESS egress ports includes a memory and an egress processor. The memory stores the data grains selected by the ingress processor. The egress processor reads and transmits the stored data grains from the memory in a predetermined order. In other embodiments the ingress processor includes a memory compactor for addressing the selected data grains for storage in the memory without memory fragmentation, the memory compactor preferably including, or using an already existing finite state machine for selecting the first available location in memory as well as a plurality of multiplexers for multiplexing the selected data grains into the memory. In other embodiments, the memory stores only the selected data grains and is preferably sized to store exactly one grain group. In other embodiments the egress processor includes an egress processing memory for storing the predetermined order for reading and transmitting the stored data grains and optionally the egress processor is connected to a connection memory for storing connection information which additionally provides the interest RAM with the predetermined criterion and the egress processing memory with the predetermined order in accordance with the stored connection information.

In a further embodiment, the egress processor includes an N:1 multiplexer attached to the memory for reading and sequentially transmitting the stored data grains in the predetermined order, where N is the number of ingress ports. In another embodiment, the egress processor includes an N:M multiplexer attached to the memory for reading and sequentially transmitting a plurality of data grains in the predetermined order, where N is the number of ingress ports and M≧1.

In another aspect of the present invention, there is provided a method of time division multiplex switching received data grains to at least one egress port. The method comprises the steps of: receiving and aggregating a plurality of data grains received in a single timeslot at a number of ingress ports, each of the plurality of data grains being associated with a grain group; transferring the aggregate of the received data grains to the at least one egress port; selecting from the aggregate the data grains to be transmitted by the at least one egress port; storing the selected data grains at the least one egress port; and transmitting the stored data grains from the at least one egress port in a predetermined order.

In embodiments of the present invention the step of selecting includes applying a mask to the aggregate to select grains in accordance with the ingress port associated with the position of the grain in the aggregate and the position of the grain in its respective grain group and the step of storing the selected grains includes storing only the selected grains. In another embodiment, the step of storing the selected grains includes compactly storing the selected grains in a memory and the step of transmitting includes reading stored grains from the memory in a predetermined order.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for multiplexing data grains received on a number of ingress ports to a number of egress ports. For the purposes of illustration, the number of ingress ports and egress ports will be identical, though one skilled in the art will readily appreciate that the teachings below can be applied to asymmetrical switching systems.

The present invention provides a time division multiplex (TDM) switch that increases the percentage utilization of components in comparison to many prior art switches. The present invention also provides a novel method of multiplexing data grains received on ingress ports to egress ports. The present invention provides a system and method of time division multiplex switching data grains received on ingress ports to a number of egress ports, each egress port storing selected received grains in a memory for transmission by the egress port.

Figure 1:
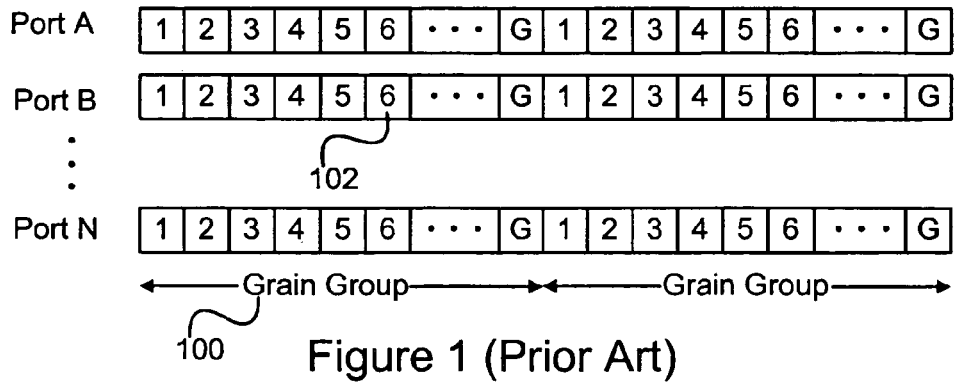
FIG. 1 is an illustration of a plurality of grain groups transmitted on a plurality of channels.
Figure 2:
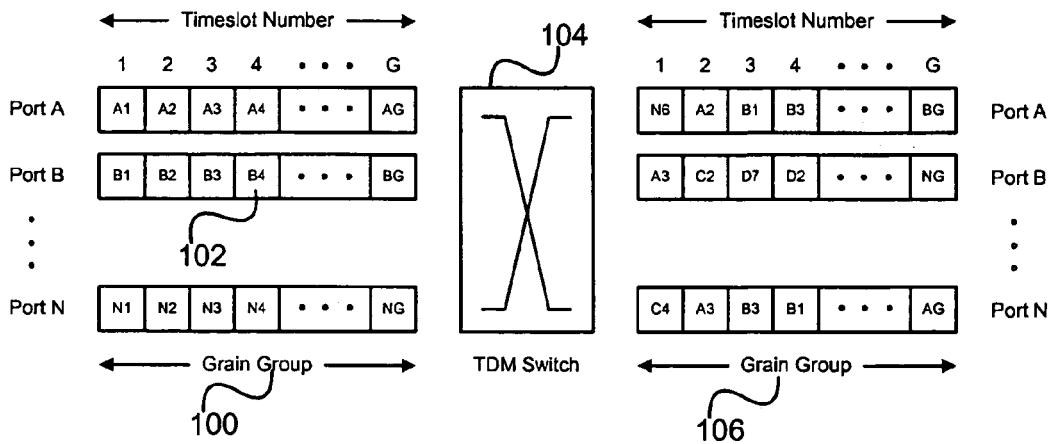
FIG. 2 is a block diagram illustration of a conventional time division multiplexing switch architecture.
Figure 3:
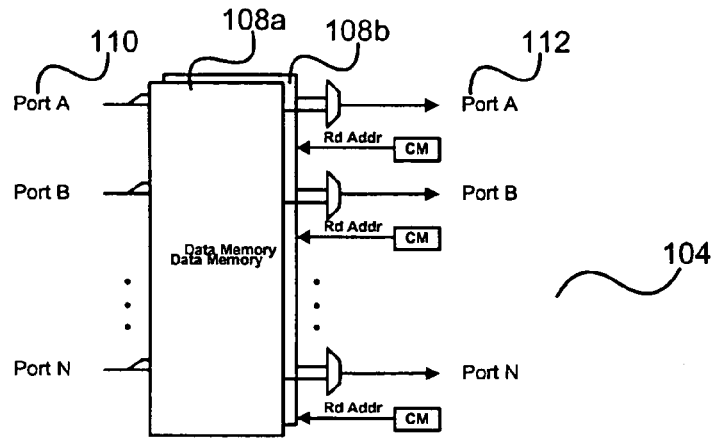
FIG. 3 is a prior art implementation of a time division multiplexing switch architecture.
Figure 4:
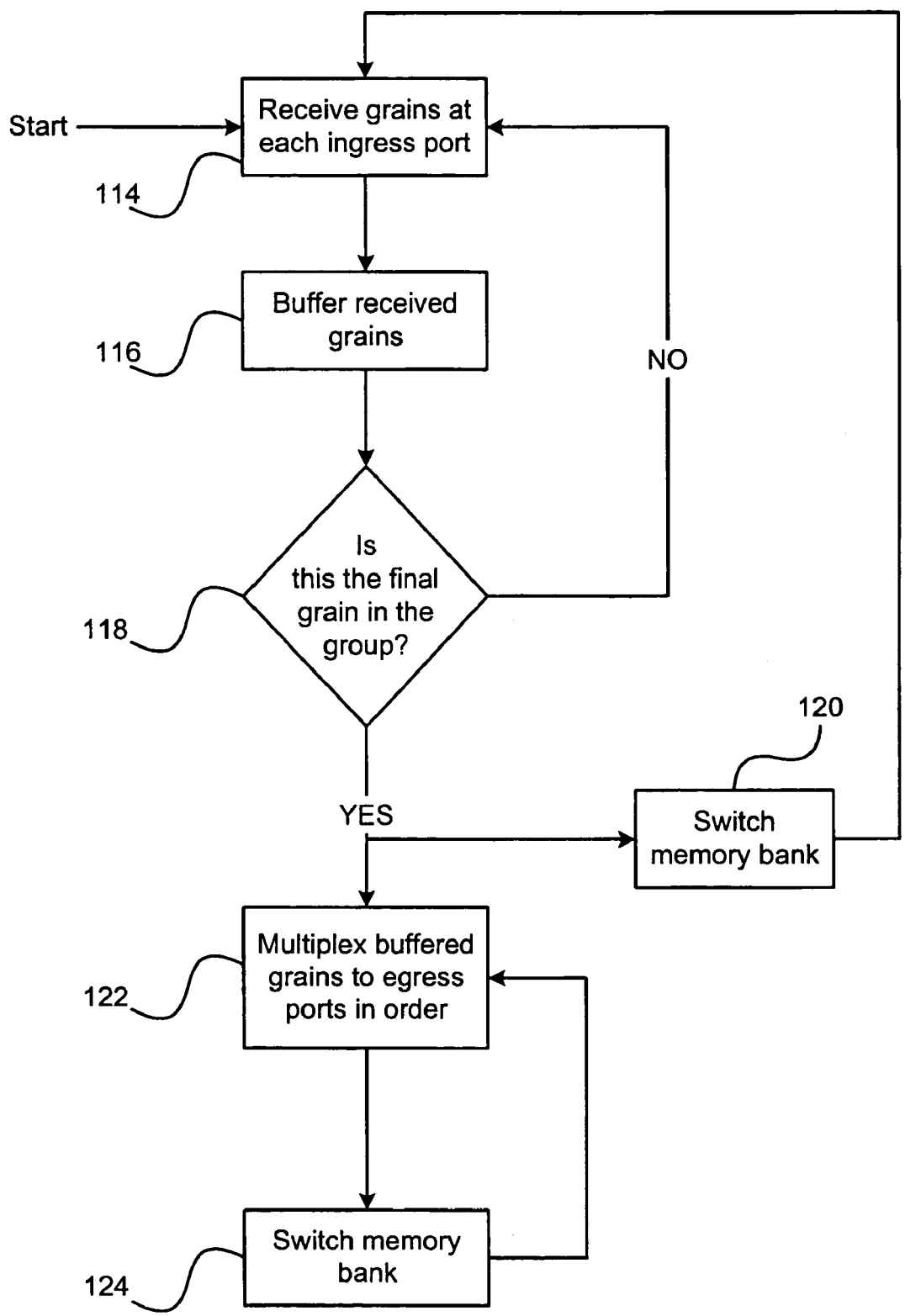
FIG. 4 is a flow chart illustrating a prior art implementation of a method to perform time division multiplex switching.
Figure 5:
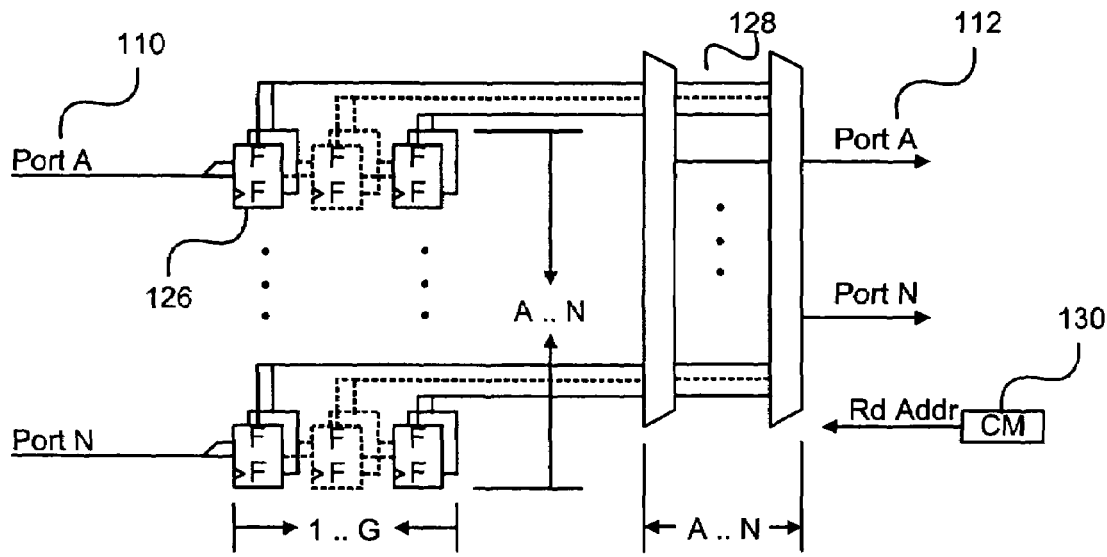
FIG. 5 is a block diagram of a prior art flip-flop based time division multiplexing switch.
Figure 6:
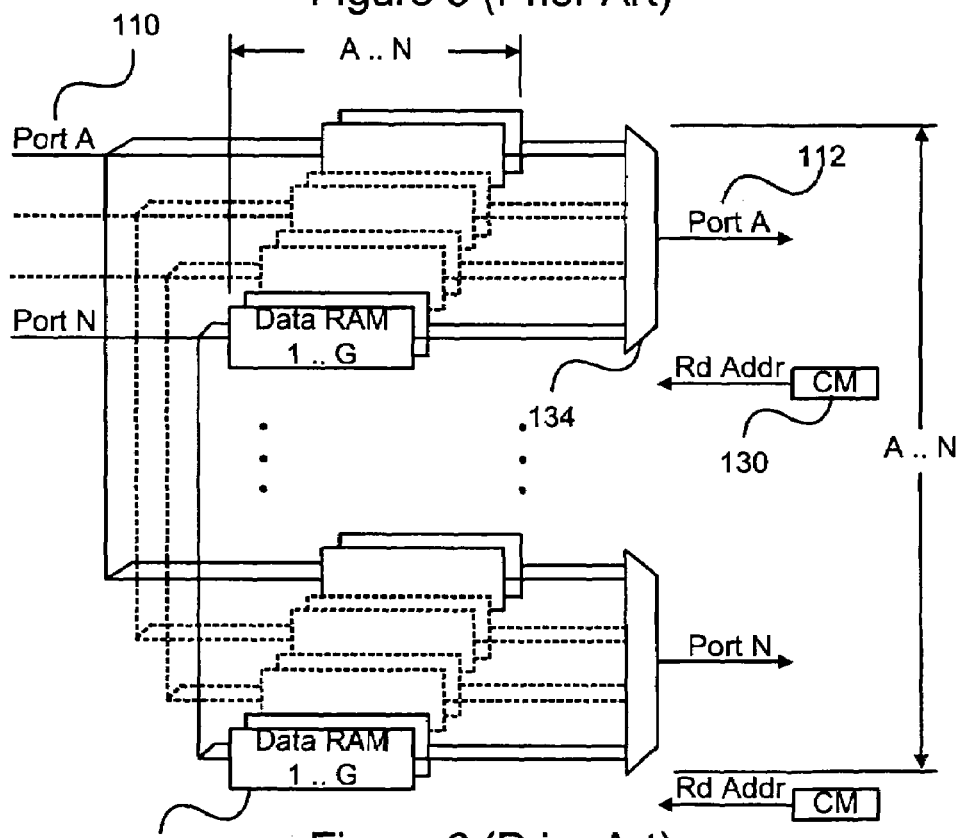
FIG. 6 is a block diagram of a prior art RAM based time division multiplexing switch.
Figure 7:
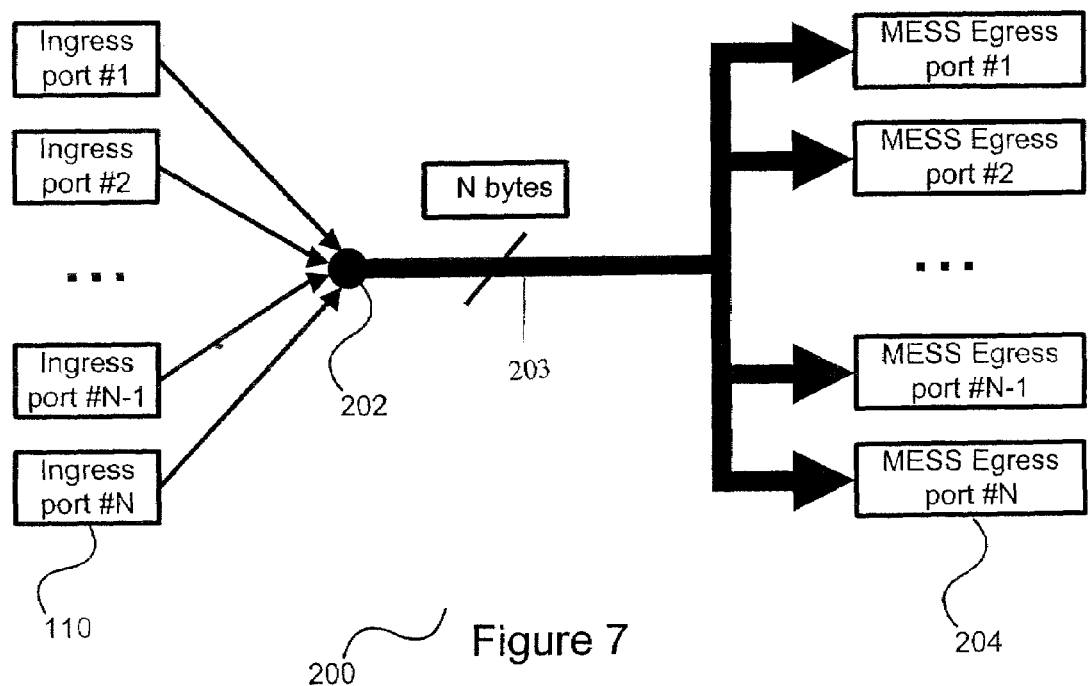
FIG. 7 is a block diagram of a system architecture of the present invention.

FIG. 7 illustrates the architecture of a system of the present invention. Ingress ports 1 through N, one of which is labelled as 110, receive data grains ordered as grain groups. Preferably the grains are received synchronously across the number of ingress ports. From ingress ports 110, the grains are aggregated by aggregator 202 into an N grain wide channel 203. For the purposes of this exemplary illustration, each data grain is assumed to be 1 byte in size, resulting in a requirement for an N byte wide channel to correspond to the N ingress ports. The N byte word representing the received grains is provided to the memory egress self selection (MESS) egress ports, one of which is labelled 204. Each MESS port 204 stores only the grains that it will transmit in an internal memory. Because each MESS port 204 has its own internal memory, the complex multiplexing circuitry utilized by the flip-flop based implementation is eliminated in favor of the simplified multiplexing circuitry of the RAM based implementation previously described. However, MESS port 204 is provided with processing capacity to determine which data grains are of interest, that is, which received data grains will be transmitted over the particular MESS port 204. By discarding the grains of no interest, or conversely by selecting the grains of interest, only the selected grains need to be stored which reduces the required memory storage for each port.

Figure 8:
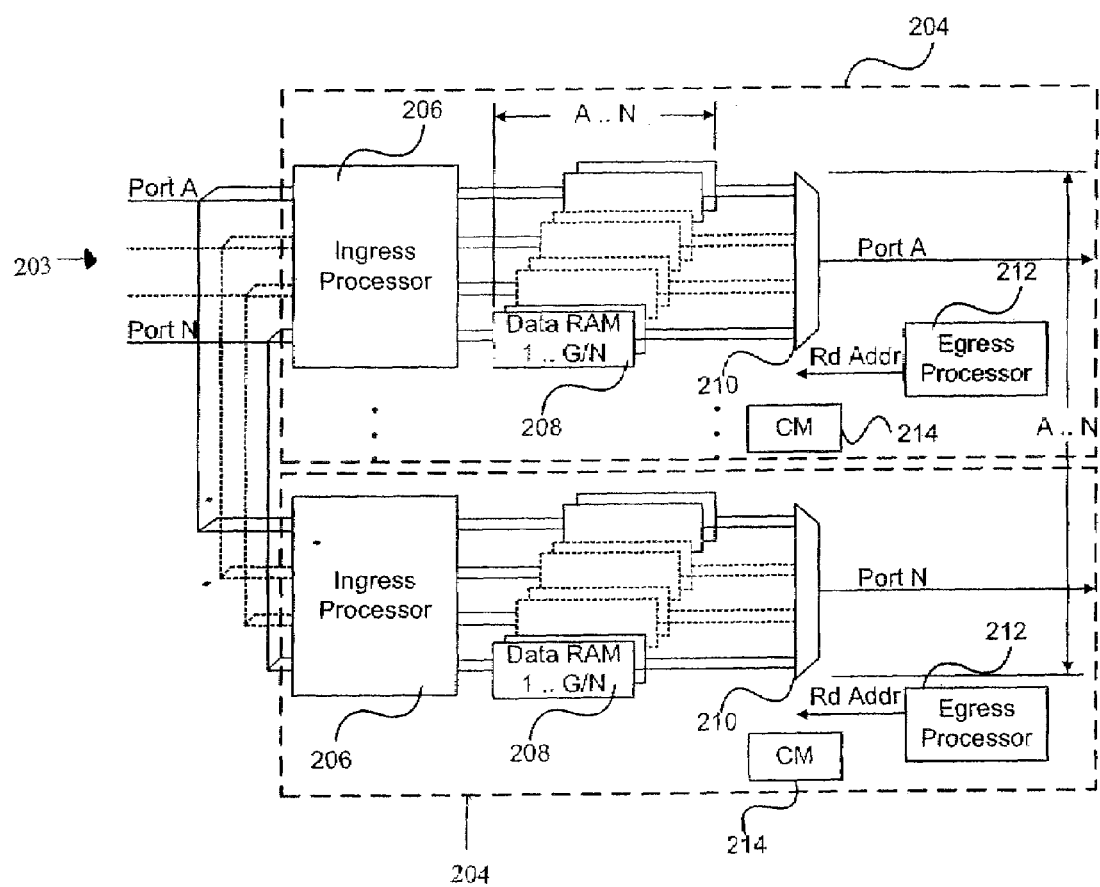
FIG. 8 is a block diagram illustrating the architecture of a system of the present invention.

FIG. 8 provides a more detailed architecture for a system of the present invention. Data grains are received by ingress ports, aggregated into an N byte wide channel 203, and provided to ingress processor 206 in MESS egress port 204. Ingress processor 206 selects data grains for storage in memory 208. Whereas the RAM based implementation required N RAMs of G bytes, the present invention reduces the required RAM, as only the grains to be transmitted by the egress port are stored. As a statistical average, this means that each of the N memories can be reduced in size to G/N from G. Over N ingress and egress ports, this reduces the memory size to G bytes from an original GN bytes. To multiplex out the stored grains while new grains are received, a double buffering implementation can be employed. The order of the addresses to be read out from the memory is provided by an egress processor 212 which accesses connection memory 214. The reading of the stored grains uses a simple N:1 multiplexer 210 on a per port basis. This combines the reduced memory requirement advantage of the standard flip-flop implementation with the simplified multiplexing circuitry advantage of the RAM implementation.

In operation, as well as in structure, the system illustrated in FIG. 8 differs from previous implementations of TDM switches. Where known TDM switches store all the ingress grains, the MESS implementation of the present invention preferably stores only the selected ingress grains at each egress port. There are still N RAMs 208 but each RAM is 1/Nth the size of the ones in the traditional RAM based implementation. The ingress processor 206 preferably packs the selected grains into the N RAMs 208 to avoid holes, also referred to as memory fragmentation. The next step is also different from both previous implementations which multiplex out the grains on the egress ports according to the connection memory configuration. In the MESS implementation of the present invention, the egress processor 212 multiplexes out the grains based on where in RAM 208 the ingress processor 206 has stored the data. Use of connection memory 214 is presently preferred for properly configuring both the ingress and egress processors 206 and 212 respectively to enable the mapping between ingress and egress ports. Double buffering is also preferably utilized in order to store one set of ingress grains while the other set is being multiplexed out. There are two extra blocks in this implementation: the ingress processor 206 and egress processor 212. The area of those two blocks is negligible when the grain count is large. As a result, the MESS implementation of the present invention reduces both the width of the egress multiplexer 210 and the number of storage elements G per egress port. The order of the area cost of a MESS based N×N memory switch is governed by the following equations.

$$\text{Area Cost}_{N \times N} = \text{Area}_{RAM} + \text{Area}_{MUX} + \text{Area}_{INGRESS\ PROC} + \text{Area Cost}_{EGRESS\ PROC} \quad (5.1)$$

$$\text{Area Cost}_{N \times N} = \text{Order}(NG) + \text{Order}(N^2 \log_2(N)) + \text{Order}(N^2 G + N^3 \log_2(N)) + \text{Order}(NG \log_2(N) + NG \log_2(G/N)) \quad (5.2)$$

Where N=number of ports

G=number of grains in a grain group

The MESS based implementation of an N×N memory switch illustrated in FIG. 8 achieves both reductions of the egress multiplexing per egress port to one N:1 multiplexer and the reduction of the minimum storage elements per egress port to G memory units. The utilization percentage of both the egress multiplexer and the storage element is 100% in the illustrated implementation.

Figure 9:
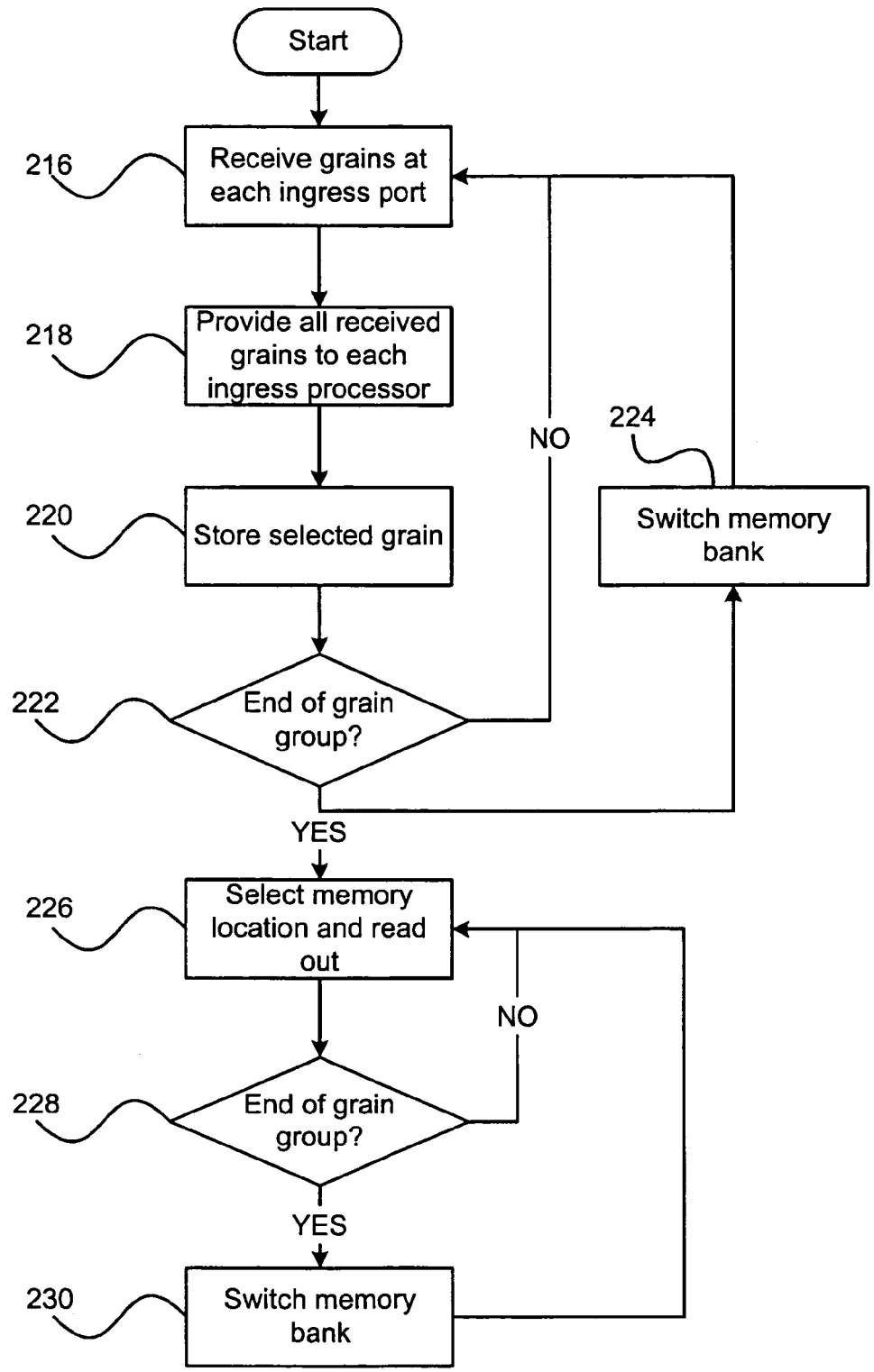
FIG. 9 is a flowchart illustrating a method of time division multiplex switching according to the present invention.

FIG. 9 is a flow chart illustrating a method of the present invention. In this embodiment of the method it is assumed that the memory bank is sized the same as the grain group, so that each memory has a capacity of one grain group. Thus, when the end of a grain group is identified the memory bank is filled. The ingress ports receive data grains in step 216. The received grains from each of the ingress ports is provided to the ingress processor in step 218. In step 220 grains selected from those received by the ingress processor in step 218 are stored in the memory. In step 222a determination as to whether the most recently received grains are the end of the grain group is made. If the end of the grain group has not been reached the process returns to step 216. If the end of the grain group has been reached the process forks. In the first fork, the memory bank is switched in step 224 and the process returns to step 216. In the second fork, a selected memory location in the recently filled memory is read out to the egress port in step 226. A determination is made as to whether the most recently read out grain is the end of the grain group in step 228. If the end of the grain group has not been reached the process returns to step 226 and grains continue to be read out for each egress port until the end of the grain group has been reached, at which point the memory bank is switched in step 230. As the egress port should transmit a grain group in the same time as the ingress port receives a grain group, the switching of memory banks should happen simultaneously.

Figure 10:
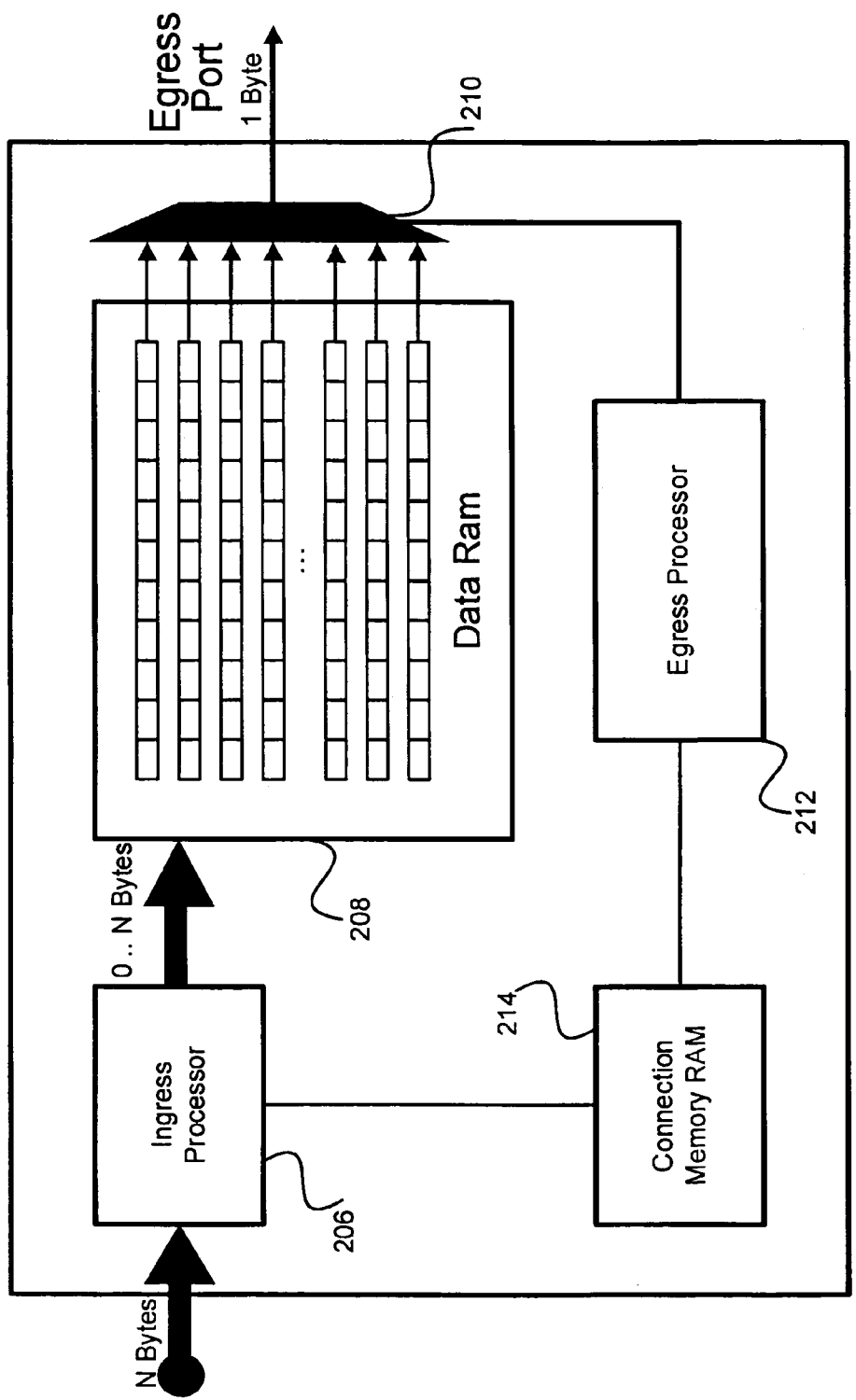
FIG. 10 illustrates a memory egress self selection port according to one embodiment of the present invention.

FIG. 10 illustrates a generic MESS Egress port 204. The wide ingress data bus feeds ingress processor 206 which selects and extracts grains and stores them in the data RAM 208. This allows for the reduction in the memory area allocation. The order of the selected grains in data RAM 208 is defined by the order in which the grains arrive at ingress processor 206. To obtain the correct output order, egress processor 212 obtains a ordered grain reading pattern from connection memory RAM 214. The order in which grains are to be read can be stored in any of a number of data structures. One skilled in the art will appreciate that any one of a number of standard listing techniques can be employed for this purpose. The egress processor 212 extracts the grains from the data RAMs and constructs the egress grain group, based on a structure and order provided by the connection memory RAM 214. The MESS architecture achieves a reduction in the implementation area by minimizing the number of storage elements as well as by reducing the egress multiplexing complexity.

Figure 11:
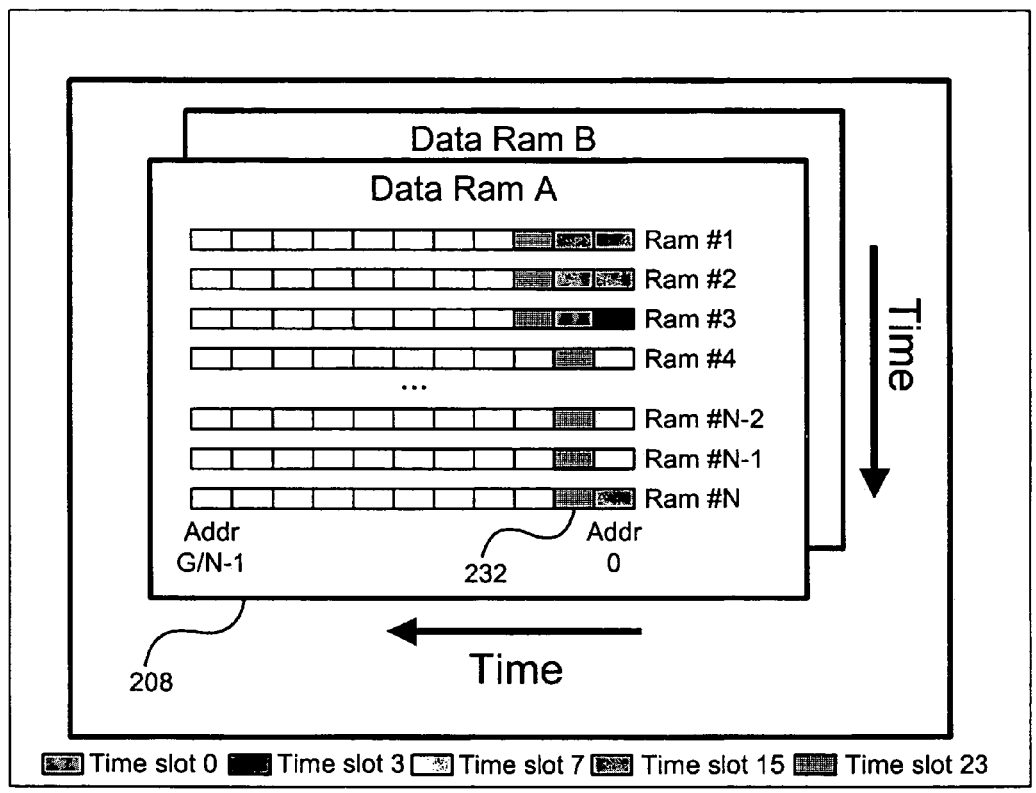
FIG. 11 illustrates the data RAM of a memory egress self selection port during operation according to one embodiment of the present invention.

FIG. 11 illustrates a hardware circuit embodiment of the data RAMs 208 used in one embodiment of the present invention. Two sets of data RAMs 208 are employed to facilitate double buffering so that the ingress processor 206 can write a grain group to one data RAM 208 while the egress processor reads a grain group from the other data RAM 208 with the specific memory written to, or read from, alternating at every grain group. In a presently preferred embodiment, each data RAM 208 can store exactly one grain group (G grains), which is the minimum size for a memory. The data RAMs 208 may be constructed from a set of N independent, 1-byte wide RAMs, a single N-byte wide RAM, or combinations therebetween. Using a set of N RAMs is presently preferable, as it does not require buffering at the ingress processor 206 and reduces power consumption on reads by a factor of N, in addition the use of N RAMs ails from between 0 to N different bytes to be written simultaneously. Because the total storage required is G bytes (assuming 1 byte grains), each of the N independent RAMs or the single wide RAM are G/N words deep. The writing of the RAMs is controlled by the ingress processor 206 and the reading of the RAMs is controlled by the egress processor 212.

The ingress processor 206 writes data into data RAMs A and B 208 sequentially starting from (RAM#1, Addr#0) to (RAM#N, Addr#0) then from (RAM #1, Addr#1) to (RAM#N, Addr#1) and then from (RAM #1, Addr#G/N−1) to (RAM#N, Addr#G/N−1). This results in a compact memory usage which avoids memory fragmentation, and results in complete usage of each memory location, one of which is labelled as 232. This technique is analogous to creating a brick wall, and as a result the memory structure is referred to as a "brick wall". The brick wall is restarted at the next grain group boundary in the companion data RAM B. 0 to N bytes can be written simultaneously in data RAM 208 since only the selected ingress grains are stored. As an example of multiple writes to data RAM 208, FIG. 11 illustrates the case of 2 grains from ingress timeslot 0 being written into RAM #1 and RAM #2, 1 grain from ingress timeslot 3 is written into RAM #3, N−4 grains from ingress timeslot 7 are written into RAM #4 to RAM #N−1, 4 grains from ingress timeslot 15 are written into RAM #N to RAM #3, N grains from ingress timeslot 23 are written into RAM #4 to RAM #3, etc. Egress processor 212 reads data from data RAM 208 using random access to properly order the outgoing grain group on the egress port.

Figure 12:
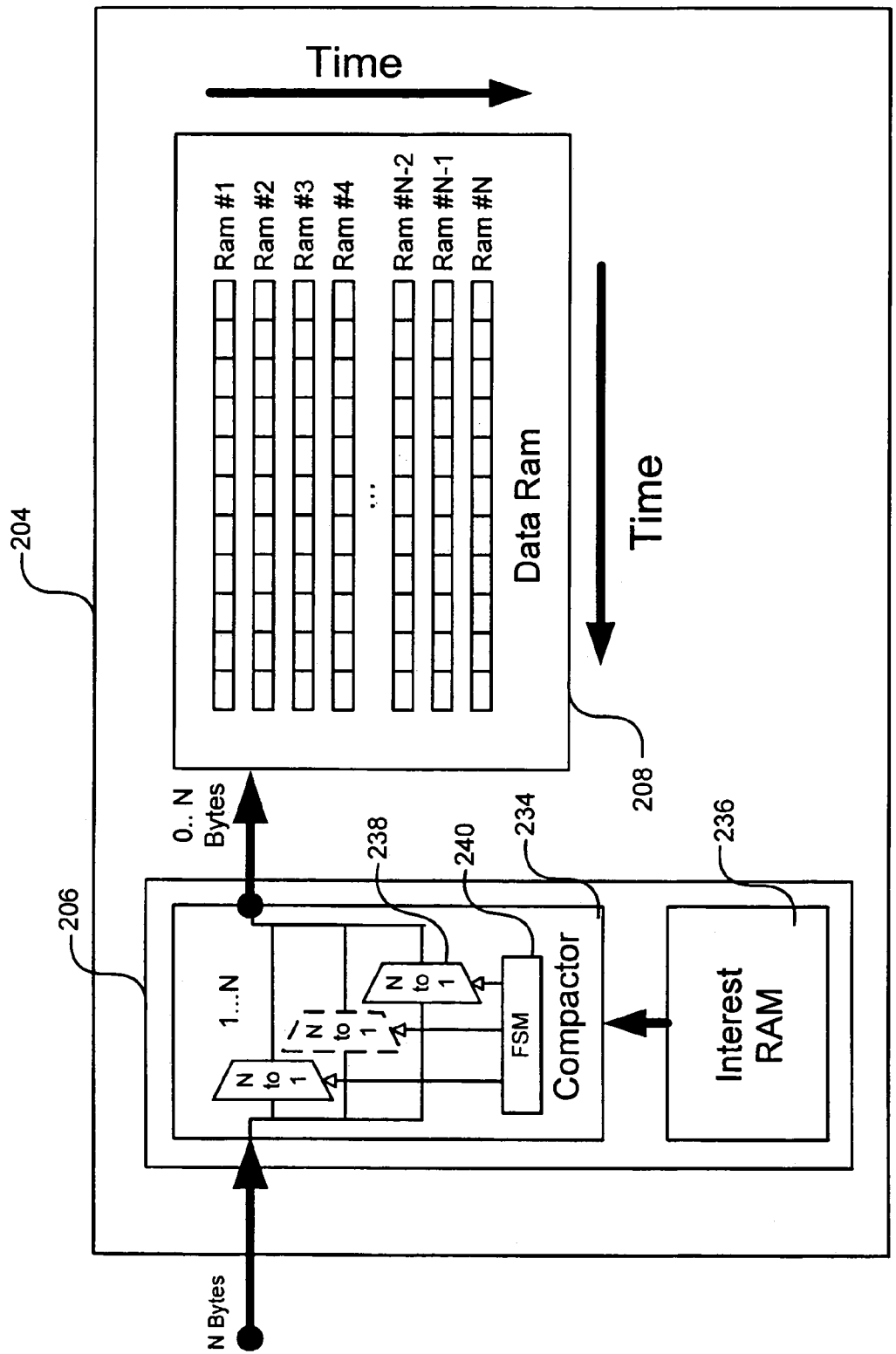
FIG. 12 illustrates the interaction between the ingress processor and data RAM of a memory egress self selection port according to one embodiment of the present invention.

The ingress processor 206 selects and formats the ingress grains to be stored in data RAM 208. FIG. 12 illustrates an embodiment of the ingress processor 206. The ingress processor 206 contains interest RAM 236 and compactor 234. Interest RAM 236 contains G words of N bits. The compactor is made of N instances of N:1 multiplexers 238 and a finite state machine (FSM) 240 to allow any of the N ingress grains to be written into any of the N data RAMs 208. Table 1 compares the MESS implementation of the present invention to the requirements of flip-flop and RAM based implementations of the prior art.

TABLE 1

| Block | Flip-Flop Implementation | RAM Implementation | MESS Implementation |
| --- | --- | --- | --- |
| compactor mux per egress port | None | None | N × N:1 |
| interest RAM Storage per egress port | None | None | NG flag |

Where   N = number of ports
G = number of grains in a grain group
Grain = 8 bits (typically)
Flag = 1 bit The ingress processor 206 selects and formats the ingress grains presented on the wide ingress data bus in order to build a compact brick wall in the data RAMs 208. The wide ingress data bus is obtained by merging all the ingress ports.

The selection of grains by ingress processor 206 is performed so that grains meeting at least one criterion are selected. In a switch having N inputs, ingress processor 206 receives N grains simultaneously. Each N grain block received corresponds to the grains received in a given timeslot. The particular timeslot that grains are received in defines the position of the grain in the grain group. Interest RAM 236 is preferably used by ingress processor 206 to store the criteria on which grains are selected. In a presently preferred embodiment, a grain is selected in accordance with the ingress port that it was received on, and the position of the grain in its grain group. Thus, interest RAM 236 can provide a selection mask to ingress processor 206 indicating the grains that should be selected from the N grain block. The interest RAM 236, thus would store G different masks, each mask corresponding to the grains to select in each of the G timeslots in the grain group.

Interest RAM 236 is preferably synchronized with the wide ingress data bus, which can be achieved by monitoring the frame reference of the data bus. In one embodiment, interest RAM 236 sequentially reads each of the G words it stores after achieving synchronization. In this embodiment, each of the G words stored in interest RAM 236 acts as a selection mask for the grains arriving at each time slot. After reading the final word in interest RAM 236 the reading is cycled back to the first word. Thus, each of the words is associated with a timeslot in a grain group. Each of the G words stored in interest RAM 236 is read at the same timeslot as the grains of that timeslot are received by compactor 234. In a presently preferred embodiment, if the interest bit is set to one, the grain is selected. Otherwise, the grain is discarded. In other words, interest RAM 236 has G bits set to one (out of NG RAM bits) and those G bits correspond to the G ingress grains (out of NG ingress grains) that must be selected by the egress port. Interest RAM 236 can be configured from the connection memory RAM 214 (shown in FIG. 10).

Compactor 234 does the data formatting of selected grains. The compactor 234 receives all the ingress grains from the wide ingress data bus and the selection flags from the interest RAM 236. Between 0 and N grains can be selected in any timeslot. If 0 grains are selected then the compactor does nothing. If n grains ($1 \leq n \leq N$) are selected, compactor 234 removes the gaps between the selected grains in order to compact the data on the data bus. Then, the compacted data on the bus is barrel shifted to properly build the compact brick wall in data RAM 208. The selection of the desired grains, and the discarding of the other grains can be simply implemented through the use of a simple 'AND' operation.

FSM 240 keeps track of the last location in the data RAMs 208 that contains valid data. At the next time-slot it controls compactor 234 to steer the first selected grain to the next free location and subsequently selected bytes to the adjacent locations, which will also be free. In a presently preferred embodiment, the location of a cell in data RAM 208 is defined by the doublet (RAM number, RAM word address).

Figure 13:
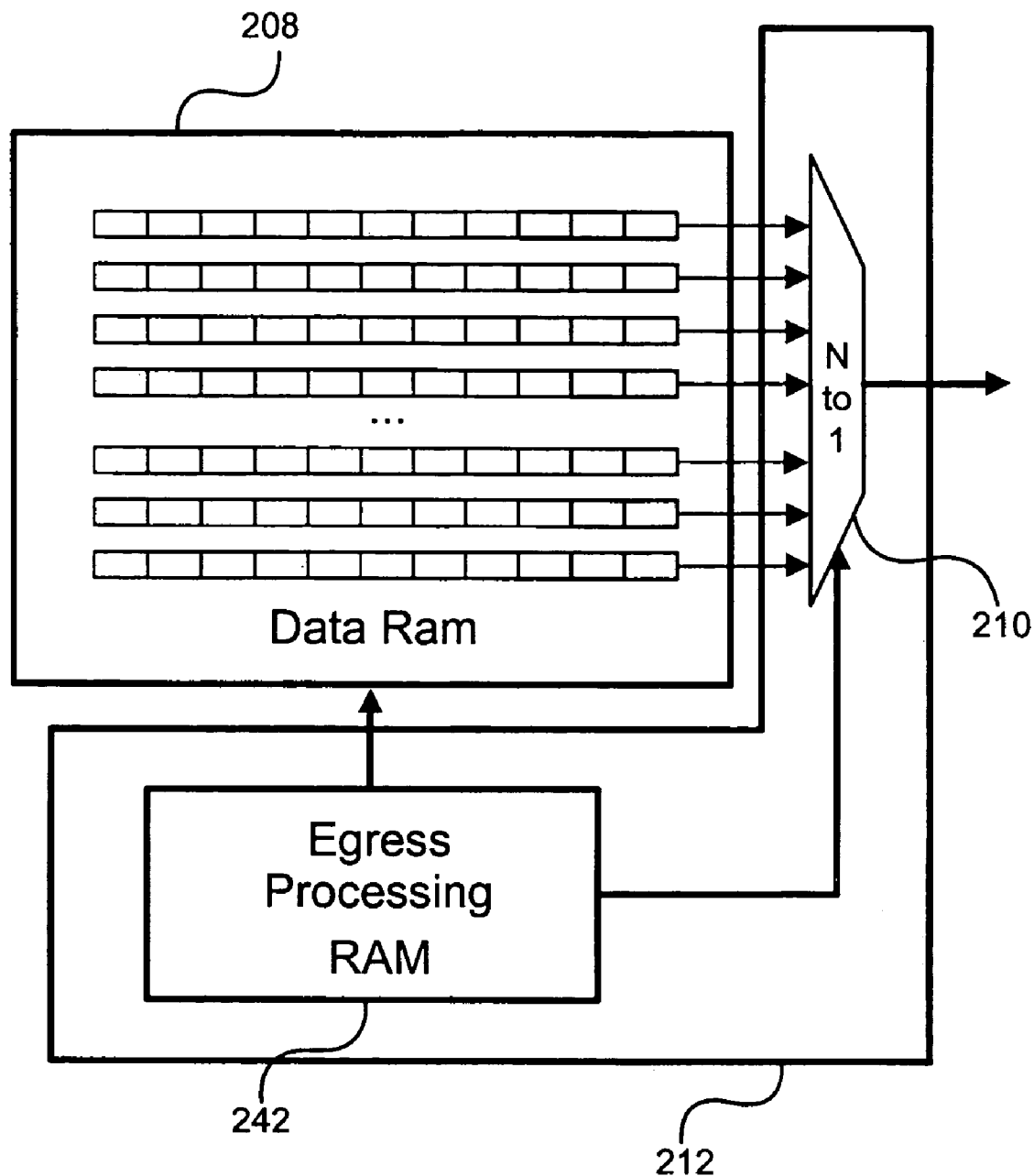
FIG. 13 illustrates the interaction between the egress processor and data RAM of a memory egress self selection port according to one embodiment of the present invention.

The egress processor 212 serves to extract the grains from data RAMs 208 and properly formats the egress grain group prior to transmission. FIG. 13 illustrates an embodiment of the egress processor 212. Egress processor 212 contains egress processing RAM 242 and N:1 multiplexer 210. The egress processing RAM 242 contains G words of $\log_2$ $$N + \log_2 \frac{G}{N}$$

bits (rounded up to the nearest bit). Table 2 compares the MESS implementation of the present invention to the requirements of flip-flop and RAM based implementations of the prior art.

TABLE 2

| Block | Flip-Flop Implementation | RAM Implementation | MESS Implementation |
|---|---|---|---|
| Egress mux per egress port | GN:1 | N:1 | N:1 |
| Egress processing RAM Storage per egress port | None | None | G Addresses |

Where  N = number of ports
G = number of grains in a grain group
Grain = 8 bits (typically)
Address = $\log_2 N + \log_2 \frac{G}{N}$ typical Egress processor 212 extracts the grains from the data RAMs 208 and properly formats the egress grain group. Egress processing RAM 242 is preferably synchronized with the wide ingress data bus. Synchronization can be achieved by monitoring the frame reference. Once synchronized, egress processing RAM 242 sequentially reads each of its G words. Each word represents the address of a grain in data RAM 208. The address, as before, is the doublet of the RAM number (1 to N) and the address location (0 to G/N−1) in the indicated RAM. Egress processing RAM 242 contains an in-order list of the addresses corresponding to the grains to be extracted and presented on the egress port. Random access from data RAMs 208 allows the grains to be accessed in order to form a proper egress grain group. The egress processing RAM 242 can be configured from the connection memory RAM 214 (shown in FIG. 10).

The present invention provides a reduced implementation area for a switch by reducing the memory footprint and complex multiplexing circuitry. This reduction requires the implementation of additional logic such as ingress processor 206 and egress processor 212. However, the area occupied by these logic blocks is negligible when the grain count G is large. The area savings attributable to memory and multiplexing reduction and simplification more than offsets the area occupied by the additional logic. To demonstrate the area savings, the following sets of equations show the area required for a SONET/SDH application (a 45 G VT/TU wideband cross connect where the grain number G equals 1344 and the port number N equals 18).

Equations 6.1 through 6.4 define the required area for a flip-flop based implementation of an N×N memory switch (or a wideband cross connect). With a flip-flop based implementation, the wideband cross connect requires 54 600 000 gates.

$$\text{Area}_{FF}=N\{10\times2\times[\text{Storage}]+[\text{Muxing}]\} \quad (6.1)$$

$$\text{Area}_{FF}=N\{10\times2\times[8 \text{ bit Grains}]+[8 \text{ bit Egress Muxing}]\} \quad (6.2)$$

$$\text{Area}_{FF}=N\{10\times2\times[8G]+[8NG \log_2(NG)]\} \quad (6.3)$$

Where N=18
G=1344

$$\text{Area}_{FF}\approx18\{215\,040+2\,818\,318\}\approx54\,600\,000 \text{ gates} \quad (6.4)$$

The factor 10 before the storage element accounts for the 10 gates required per flip-flop, while the factor 2 before the storage element accounts for the double buffering.

Equations 7.1 through 7.4 define the required area for a RAM based implementation of an N×N memory switch (or a wideband cross connect). With a RAM based implementation, the wideband cross connect requires 20 900 000 gates.

$$\text{Area}_{RAM}=N\{3\times2\times[\text{Storage}]+[\text{Muxing}]\} \quad (7.1)$$

$$\text{Area}_{RAM}=N\{3\times2\times[8 \text{ bit Grains}]+[8 \text{ bit Egress Muxing}]\} \quad (7.2)$$

$$\text{Area}_{RAM}=N\{3\times2\times[8NG]+[8N \log_2(N)]\} \quad (7.3)$$

Where N=18
G=1344

$$\text{Area}_{RAM}\approx18\{1\,161\,216+600\}\approx20\,900\,000 \text{ gates} \quad (7.4)$$

The factor 3 before the storage element accounts for the 3 gates required per RAM bit, while the factor 2 before the storage element accounts for the double buffering.

Equations 8.1 through 8.4 define the required area for a MESS based implementation of an N×N memory switch (or a wideband cross connect). With a MESS based implementation, the wideband cross connect requires 5 500 000 gates.

$$\text{Area}_{MESS}=N\{3\times2\times[\text{Storage}]+[\text{Muxing}]\} \quad (8.1)$$

$$\text{Area}_{MESS}=N\{3\times2\times[8 \text{ bit Grains+interest+Egress}]+[8 \text{ bit compactor+8 bit Egress Muxing}]\} \quad (8.2)$$

$$\text{Area}_{MESS}=N\{3\times2\times[8G+NG+G \log_2(N)+G \log_2(G/N)]+[8N^2 \text{Log}_2(N)+8N \log_2(N)]\} \quad (8.3)$$

Where N=18
G=1344

$$\text{Area}_{MESS}\approx18\{293\,467+11\,408\}\approx5\,500\,000 \text{ gates} \quad (8.4)$$

The factor 3 before the storage element accounts for the 3 gates required per RAM bit, while the factor 2 before the storage element accounts for the double buffering.

Using the above calculated values, the area saving in relation to the prior art is at least a 73% area reduction in comparison to either the flip-flop or the RAM based implementation when the grain count G is large.

The embodiment of the invention as described above utilizes a connection memory RAM 214 to allow an operator to configure the interest RAM 236 and the egress processing RAM 242. One skilled in the art will appreciate that the connection memory RAM 214 is merely preferably employed in the system of the present invention. The connection memory RAM 214 provides a convenient tool to allow the user to program the memory switch by defining the egress doublet (egress grain, ingress grain) for each egress grain. Nevertheless, the connection memory RAM 214 can easily be removed and both the interest RAM 236 and the egress processing RAM 242 can be configured directly via a microprocessor interface.

One skilled in the art will also appreciate that the MESS egress port 204 can be implemented with an N:M multiplexer in place of N:1 multiplexer 210. This allows for a single MESS egress port 204 to replace a plurality of egress ports, which avoids duplicating control logic such as frame counters and synchronizing circuitry. Such an implementation requires the interest RAM 236 and the egress processing RAM 242 to be accordingly adjusted. The interest RAM 236 should store a mask that selects all grains destined for one of the plurality of egress ports served by the MESS egress port 204. In this embodiment, the egress processing RAM 242 stores M-plets of data for selecting the addresses of the M grains required at a single time. This implementation preferably utilizes a multiple read data RAM 208 that allows M addresses to be read simultaneously. This can be implemented through a number of known memory configurations.

The above described system can be used in conjunction with any system where data must be switched from ingress sources to egress destinations. One skilled in the art will appreciate that it is preferably used in systems where the number of grains in a grain group is sufficiently large so as to provide an area savings. However, if area consumption is not a concern, it can be used in very small grain group scenarios.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A time division multiplexing switch comprising:
   a plurality of ingress ports, each of the ingress ports in the plurality for synchronously receiving data grains at fixed time intervals, the data grains ordered as grain groups;
   a plurality of memory egress self selection (MESS) egress ports, for receiving the data grains from the plurality of ingress ports, and transmitting the data grains in a predetermined order; and
   a grain aggregator, operatively connected to the plurality of ingress ports, for aggregating the data grains received by each of the ingress ports during a single timeslot into an aggregate of data grains in an N grain wide channel, where N is the number of ingress ports, and for providing the aggregate of data grains to the plurality of MESS egress ports simultaneously;
   each MESS egress port from the plurality having a data grain selector for selecting from the aggregate of data grains only data grains that the MESS egress port will transmit, prior to storing the selected grains for transmission by the MESS egress port;
   said data grain selector being able to select up to N data grains during a single timeslot in accordance with at least one predetermined criterion being based on the ingress port associated with the received data grains and a position of a grain in its respective grain group.

2. The time division multiplexing switch of claim 1, wherein the data grain selector includes an ingress processor for receiving the aggregate of the data grains, and for selecting data grains from the aggregate for storage in accordance with the at least one predetermined criterion.

3. The time division multiplexing switch of claim 2, wherein the ingress processor includes an interest memory for storing a grain mask corresponding to the predetermined grain selection criterion and a finite state machine for selecting grains from the aggregate for storage in accordance with the grain mask by compacting incoming data grains into data memory at each egress port to remove gaps between the selected grains.

4. The time division multiplexing switch of claim 2, wherein each of the MESS egress ports includes:
   a memory for storing the selected data grains, the memory including a plurality of random access memories (RAMs) for storing a received grain; and
   an egress processor for reading and transmitting the stored data grains from the memory in a predetermined order.

5. The time division multiplexing switch of claim 4, wherein the ingress processor includes a memory compactor for addressing the selected data grains for storage in the memory without memory fragmentation.

6. The time division multiplexing switch of claim 5 wherein the memory compactor includes a finite state machine for selecting the first available location in memory and a plurality of multiplexers for multiplexing the selected data grains into the memory.

7. The time division multiplexing switch of claim 4, wherein the memory is sized to store exactly one grain group.

8. The time division multiplexing switch of claim 4, wherein the memory stores only the selected data grains.

9. The time division multiplexing switch of claim 4, wherein the egress processor includes an egress processing memory for storing the predetermined order for reading and transmitting the stored data grains.

10. The time division multiplexing switch of claim 4, wherein the egress processor includes an N:1 multiplexer attached to the memory for reading and sequentially transmitting the stored data grains in the predetermined order, where N is the number of ingress ports.

11. The time division multiplexing switch of claim 4, wherein the egress processor includes an N:M multiplexer attached to the memory for reading and sequentially transmitting a plurality of data grains in the predetermined order, where N is the number of ingress ports and $M \geq 1$.

12. A time division multiplexing switch comprising:
    a plurality of ingress ports, each of the ingress ports in the plurality for synchronously receiving data grains at fixed time intervals, the data grains ordered as grain groups;
    a plurality of memory egress self selection (MESS) egress ports, for receiving the data grains from the plurality of ingress ports and for transmitting stored data grains in a predetermined order, and
    a grain aggregator, operatively connected to the plurality of ingress ports, for aggregating the data grains received by each of the ingress ports during a single timeslot into an aggregate of data grains in an N grain wide data channel, where N is the number of ingress ports, and for providing the aggregate of data grains to the plurality of MESS egress ports simultaneously;
    each MESS egress port from the plurality having a data grain selector for selecting from the aggregate of data grains only data grains that the MESS egress port will transmit;
    said data grain selector being able to select up to N data grains during a single timeslot in accordance with at least one predetermined criterion prior to storing the selected grains for transmission by the MESS egress port,
    wherein the data grain selector includes an ingress processor for receiving the aggregate of the data grains received by the plurality of ingress ports during a single timeslot, and for selecting data grains from the aggregate for storage in accordance with the at least one predetermined criterion,
    wherein the ingress processor includes an interest memory for storing a grain mask corresponding to the predetermined grain selection criterion and a finite state machine for selecting grains from the aggregate for storage in accordance with the grain mask, and
    wherein the grain mask is based on the associated ingress port and the position of the grain in the respective grain group.

13. A time division multiplexing switch comprising:
    a plurality of ingress ports, each of the ingress ports in the plurality for synchronously receiving data grains at fixed time intervals, the data grains ordered as grain groups;
    a plurality of memory egress self selection (MESS) egress ports, for receiving the data grains from the plurality of ingress ports and for transmitting stored data grains in a predetermined order; and a grain aggregator, operatively connected to the plurality of ingress ports, for aggregating the data grains received by each of the ingress ports during a single timeslot into an aggregate of data grains in an N grain wide channel where N is the number of ingress ports, and for providing the aggregate of data grains to the plurality of MESS egress ports simultaneously;

each MESS egress port from the plurality having a data grain selector for selecting from the aggregate of data grains only data grains that the MESS egress port will transmit, said selection is performed in accordance with at least one predetermined criterion prior to storing the selected grains for transmission by the MESS egress port, said data grain selector being able to select up to N data grains during a single timeslot;

wherein the data grain selector includes an ingress processor for receiving an aggregate of the data grains received by the plurality of ingress ports, and for selecting data grains from the aggregate for storage in accordance with the at least one predetermined criterion, wherein each of the MESS egress ports includes:

a memory for storing the selected data grains, and an egress processor for reading and transmitting the stored data grains from the memory in a predetermined order, the egress processor including an egress processing memory for storing the predetermined order for reading and transmitting the stored data grains; and the switch further including a connection memory for storing connection information, for providing an interest RAM with the predetermined criterion and the egress processing memory with the predetermined order in accordance with the stored connection information.

14. A method of time division multiplex switching received data grains to a plurality of egress ports, the method comprising:

receiving and aggregating a plurality of data grains received in a single timeslot at a number N of ingress ports in an N grain wide channel, each of the plurality of data grains being associated with a grain group;

transferring the aggregate of the received data grains to the plurality of egress ports simultaneously;

at a selected egress port in the plurality of egress ports, selecting from the aggregate only data grains that the selected egress port will transmit, the selected data grains numbering up to N data grains in a single timeslot, including applying a mask to the aggregate to select grains in accordance with the ingress port associated with the position of the grain in the aggregate and the position of the grain in its respective grain group;

storing the selected data grains at the selected egress port; and transmitting the stored data grains from the selected egress port in a predetermined order.

15. The method of claim 14 wherein the step of storing the selected grains includes compactly storing the selected grains in a memory.

16. The method of claim 15 wherein the step of transmitting includes reading stored grains from the memory in a predetermined order.

17. The method of claim 14 wherein the steps of selecting, storing and transmitting are performed at each of the plurality of egress ports.

* * * * *